(12) United States Patent
Yonan et al.

(10) Patent No.: US 9,902,400 B2
(45) Date of Patent: Feb. 27, 2018

(54) METHOD AND SYSTEM FOR CONTROLLING A VEHICLE CAPABLE OF OPERATING IN FUEL ECONOMY MODE

(71) Applicant: GM GLOBAL TECHNOLOGY OPERATIONS LLC, Detoit, MI (US)

(72) Inventors: Jakob Yonan, Sterling Heights, MI (US); Gary W. Gantt, Jr., Chesterfield Township, MI (US); Varsha Sadekar, Detroit, MI (US); Mark J. Rychlinski, Farmington Hills, MI (US)

(73) Assignee: GM GLOBAL TECHNOLOGY OPERATIONS LLC, Detoit, MI (US)

( * ) Notice: Subject to any disclaimer, the term of this patent is extended or adjusted under 35 U.S.C. 154(b) by 214 days.

(21) Appl. No.: 14/946,084

(22) Filed: Nov. 19, 2015

(65) Prior Publication Data

US 2017/0144666 A1 May 25, 2017

(51) Int. Cl.
*B60W 30/182* (2012.01)
*B60W 40/02* (2006.01)
*F02N 11/08* (2006.01)
*F02D 41/14* (2006.01)

(52) U.S. Cl.
CPC .......... *B60W 30/182* (2013.01); *B60W 40/02* (2013.01); *F02N 11/0803* (2013.01); *F02N 11/0814* (2013.01); *F02N 11/0862* (2013.01); *F02D 2041/1412* (2013.01); *F02D 2200/0414* (2013.01); *F02D 2200/0416* (2013.01); *F02N 11/0825* (2013.01); *F02N 2200/061* (2013.01); *F02N 2200/122* (2013.01); *F02N 2200/123* (2013.01); *Y02T 10/48* (2013.01)

(58) Field of Classification Search
CPC . B60W 30/182; B60W 40/02; F02N 11/0803; F02N 11/0862; F02N 2200/061; F02N 2200/122; F02N 2200/123
See application file for complete search history.

(56) References Cited

U.S. PATENT DOCUMENTS

| 7,528,570 | B2 * | 5/2009 | Schiller | F02N 11/0862 320/104 |
| 7,741,805 | B2 * | 6/2010 | Zhang | B60R 16/033 320/104 |
| 8,751,062 | B2 * | 6/2014 | Van Wiemeersch | B60R 16/033 701/113 |

(Continued)

*Primary Examiner* — Sizo Vilakazi
*Assistant Examiner* — Kevin R Streckbauer
(74) *Attorney, Agent, or Firm* — Reising Ethington, P.C.

(57) ABSTRACT

A method and system are provided for controlling a vehicle capable of operating in a fuel economy mode in which fuel is conserved by limiting operation of an engine. The method includes obtaining forecast temperatures for one or more dates and comparing the forecast temperature for each date to a threshold temperature. The method further includes generating a control signal if the forecast temperature for a given date meets a predetermined condition relative to the threshold temperature. The control signal is configured to disable fuel economy mode of the vehicle. The method further includes disabling the fuel economy mode of the vehicle in response to receiving the control signal. By disabling fuel economy mode at selected temperatures, the method and system allow the vehicle to preserve a sufficient state of charge in the vehicle battery for cold starts.

20 Claims, 3 Drawing Sheets

(56) References Cited

U.S. PATENT DOCUMENTS

| | | | | |
|---|---|---|---|---|
| 8,907,620 | B2* | 12/2014 | Van Wiemeersch | B60R 16/033 |
| | | | | 180/65.1 |
| 8,972,152 | B2* | 3/2015 | Boesch | F02N 11/0837 |
| | | | | 123/179.2 |
| 8,989,935 | B2* | 3/2015 | Martin | F02D 29/02 |
| | | | | 123/295 |
| 9,296,388 | B2* | 3/2016 | Martin | F02D 29/02 |
| 9,679,486 | B2* | 6/2017 | Li | G08G 1/145 |
| 2006/0208739 | A1* | 9/2006 | Schiller | F02N 11/0862 |
| | | | | 324/426 |
| 2009/0045815 | A1* | 2/2009 | Zhang | B60R 16/033 |
| | | | | 324/426 |
| 2011/0163718 | A1* | 7/2011 | Van Wiemeersch | B60R 16/033 |
| | | | | 320/109 |
| 2011/0163721 | A1* | 7/2011 | Van Wiemeersch | B60R 16/033 |
| | | | | 320/128 |
| 2013/0110374 | A1* | 5/2013 | Boesch | F02N 11/0837 |
| | | | | 701/102 |
| 2014/0288736 | A1* | 9/2014 | Martin | F02D 29/02 |
| | | | | 701/22 |
| 2015/0197241 | A1* | 7/2015 | Martin | F02D 29/02 |
| | | | | 701/22 |
| 2017/0044960 | A1* | 2/2017 | Naidu | F02D 41/1446 |
| 2017/0046957 | A1* | 2/2017 | Jordens | B60H 1/00778 |
| 2017/0115398 | A1* | 4/2017 | Li | G08G 1/145 |

* cited by examiner

METHOD AND SYSTEM FOR CONTROLLING A VEHICLE CAPABLE OF OPERATING IN FUEL ECONOMY MODE

FIELD

The present invention relates generally to a vehicle system. More specifically, the invention relates to a method and system for controlling a vehicle capable of operating in a fuel economy mode in which fuel is conserved by limiting operation of an engine.

BACKGROUND

Conventional vehicles include an internal combustion engine that provides all or a portion of motive power for the vehicle and a battery that provide electrical power to various electric systems in the vehicle including a starter motor for the internal combustion engine. Because of the need to maintain sufficient power for key vehicle components such as the starter motor, the state-of-charge (SOC) of the battery is carefully monitored and power delivery from the battery is controlled to maintain a sufficient SOC. A generator is coupled to the internal combustion engine and, during operation of the engine, provides electrical power to vehicle electrical systems in order to reduce power demands from the battery.

The generator includes a voltage regulator. The voltage regulator can be controlled to implement a variety of different operating modes for the vehicle. In a fuel economy mode, for example, the voltage regulator reduces the voltage output of the generator to reduce the amount of fuel required by the internal combustion engine and thereby conserve fuel. Because the voltage output of the generator is reduced, additional power demands are placed on the vehicle battery. One of the conditions for entering fuel economy mode may therefore be that the battery has a sufficient SOC (e.g., more than 80%).

The battery must maintain a sufficient SOC to power the starter motor. The SOC required to power the starter motor can vary with changes in the weather. In particular, when ambient air temperatures are low, a greater SOC may be required to power the starter motor. Because operating in fuel economy mode places additional power demands on the vehicle battery, the SOC of the battery may be reduced to a level that is insufficient to power the starter motor during a subsequent restart of the vehicle.

SUMMARY

According to one embodiment, there is provided a method for controlling a vehicle capable of operating in a fuel economy mode in which fuel is conserved by limiting operation of an engine. The method includes the steps of obtaining a forecast temperature for a future date and comparing the forecast temperature to a threshold temperature. The method further includes the step of generating a control signal if the forecast temperature meets a predetermined condition relative to the threshold temperature. The control signal is configured to disable the fuel economy mode of the vehicle. The method further includes the step of disabling the fuel economy mode of the vehicle in response to receiving the control signal According to another embodiment, there is provided a system for controlling a vehicle capable of operating in a fuel economy mode in which fuel is conserved by limiting operation of an engine. The system includes a generator connected configured to generate electricity responsive to mechanical motion of an engine. The generator has a voltage regulator that regulates an output voltage of the generator. The system further includes a controller configured to obtain a forecast temperature for a future date and compare the forecast temperature to a threshold temperature. The controller is further configured to generate a control signal if the forecast temperature meets a predetermined condition relative to the threshold temperature. The control signal is configured to disable the fuel economy mode of the vehicle. The control signal causes the voltage regulator to disable the fuel economy mode of the vehicle.

DRAWINGS

Preferred exemplary embodiments will hereinafter be described in conjunction with the appended drawings, wherein like designations denote like elements, and wherein.

DESCRIPTION

The system and method described herein may be used to disable a fuel economy mode of a vehicle in order to preserve a sufficient SOC in the vehicle battery to power a starter motor when ambient temperatures are excessively low. According to an exemplary embodiment, forecast temperatures for one or more future days are obtained and compared to a threshold temperature. If the forecast temperature for a given date is below the threshold temperature, fuel economy mode is disabled in order to prevent a reduction in the battery SOC. In this manner, the battery will have a sufficient SOC to start the vehicle when temperatures are low.

Figure 1:
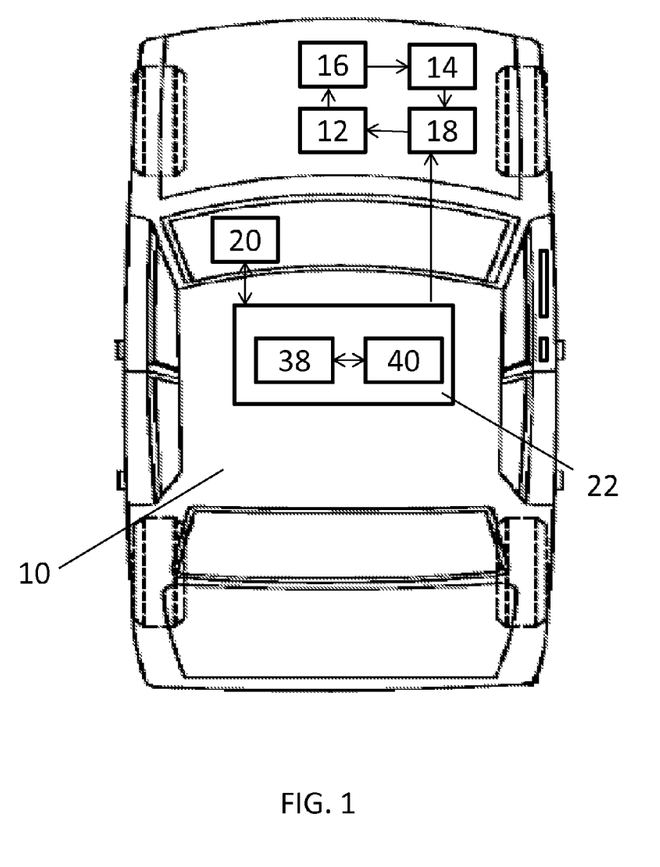
FIG. 1 is a schematic view of an exemplary vehicle including one embodiment of a system for controlling a vehicle capable of operating in a fuel economy mode in which fuel is conserved by limiting operation of an engine.

Referring now to the drawings wherein like reference numerals are used to identify identical components in the various views, FIG. 1 illustrates one embodiment of a vehicle 10 capable of operating in a fuel economy mode in which fuel is conserved by limiting operation of an engine and a system for controlling the vehicle 10. In the illustrated embodiment, vehicle 10 comprises a conventional vehicle powered by an internal combustion engine. It should be understood, however, that the system and method disclosed herein can be used with a wide variety of vehicles, including hybrid vehicles powered by an internal combustion engine and one or more electric motors including PHEVs, hybrid electric vehicles (HEVs), or extended-range electric vehicles (EREVs), to cite a few possibilities. Vehicle 10 may include a battery 12, an engine 14, a starter motor 16, a generator 18, a telematics unit 20 and a controller 22 among other components.

Battery 12 stores electrical energy and provides the vehicle 10 with electrical power. Battery 12 may receive electrical power from various sources within the vehicle including regenerative braking, generator 18, or other sources via connections within vehicle 10. Battery 12 may include a collection of identical or individual battery cells connected in series, parallel, or a combination of both in order to deliver a desired voltage, amperage, capacity, power density and/or other performance characteristics. Generally, it is desirable to provide high power and energy densities, which has led to the development and use of many types of batteries including chemical, non-chemical, and others. Some examples of suitable battery types include those that are based on the following technologies: lithium ion, nickel metal hydride (NiMH), nickel cadmium (NiCd), sodium nickel chloride (NaNiCl), ultracapacitor, or some other battery technology. The battery 12 may provide approximately 12-48V, depending on its particular design and application. Battery sensors formed from any combination of hardware and/or software components may be used to monitor battery conditions such as battery temperature, battery voltage, battery current, battery state of charge (SOC), battery state of health (SOH), battery state of function, etc. These sensors may be integrated within battery 12 (e.g., an intelligent or smart battery), they may be external sensors located outside of the battery 12, or they may be provided according to some other known arrangement. The sensors may monitor and determine battery conditions on a cell-by-cell basis, on an average or collective basis across a block or region of cells, on an entire battery pack basis, on a representative basis where certain cells are selected to represent the entire battery pack, or according to some other basis or technique known in the art. Output from the battery sensors may be provided to a battery control unit, controller 22, or some other appropriate device that may have information relating to pertinent battery characteristics and background information pertaining to the battery's cell chemistry, cell capacity, upper and lower battery voltage limits, battery current limits, battery temperature limits, temperature profiles, battery impedance, number or history of charge/discharge events, etc.

Engine 14 may be mechanically coupled to, and used to directly drive, one or more vehicle wheels which in turn propels the vehicle (e.g., in a conventional vehicle or a parallel hybrid vehicle) using conventional internal combustion techniques. Alternatively, engine 14 may indirectly drive the vehicle wheels through generator 18 and an electric motor (e.g., in a series hybrid vehicle). Engine 14 may include any suitable type of engine known in the art. Some examples of suitable engines include gasoline, diesel, ethanol, flex-fuel, naturally aspirated, turbo-charged, super-charged, rotary, Otto-cycle, Atkins-cycle and Miller-cycle engines, as well as any other suitable engine type known in the art. According to the specific embodiment shown here, engine 14 is a small fuel-efficient engine (e.g., a small displacement, turbo-charged four-cylinder engine) that uses its mechanical output to turn generator 18. Skilled artisans will appreciate that engine 14 may be provided according to any number of different embodiments, may be connected in any number of different configurations and may include any number of different components, like sensors, control units and/or any other suitable components known in the art.

Starter motor 16 provides power to engine 14 in order to begin rotation of engine 14 and initiate operation of engine 14. Motor 16 may comprise an electric motor such as a permanent magnet or series-parallel wound direct current electric motor with a solenoid that controls delivery of current from battery 12. The solenoid may be activated by a key or button in the vehicle cabin or remotely by sending a signal using a key fob, smartphone or other device over a telecommunications network.

Figure 2:
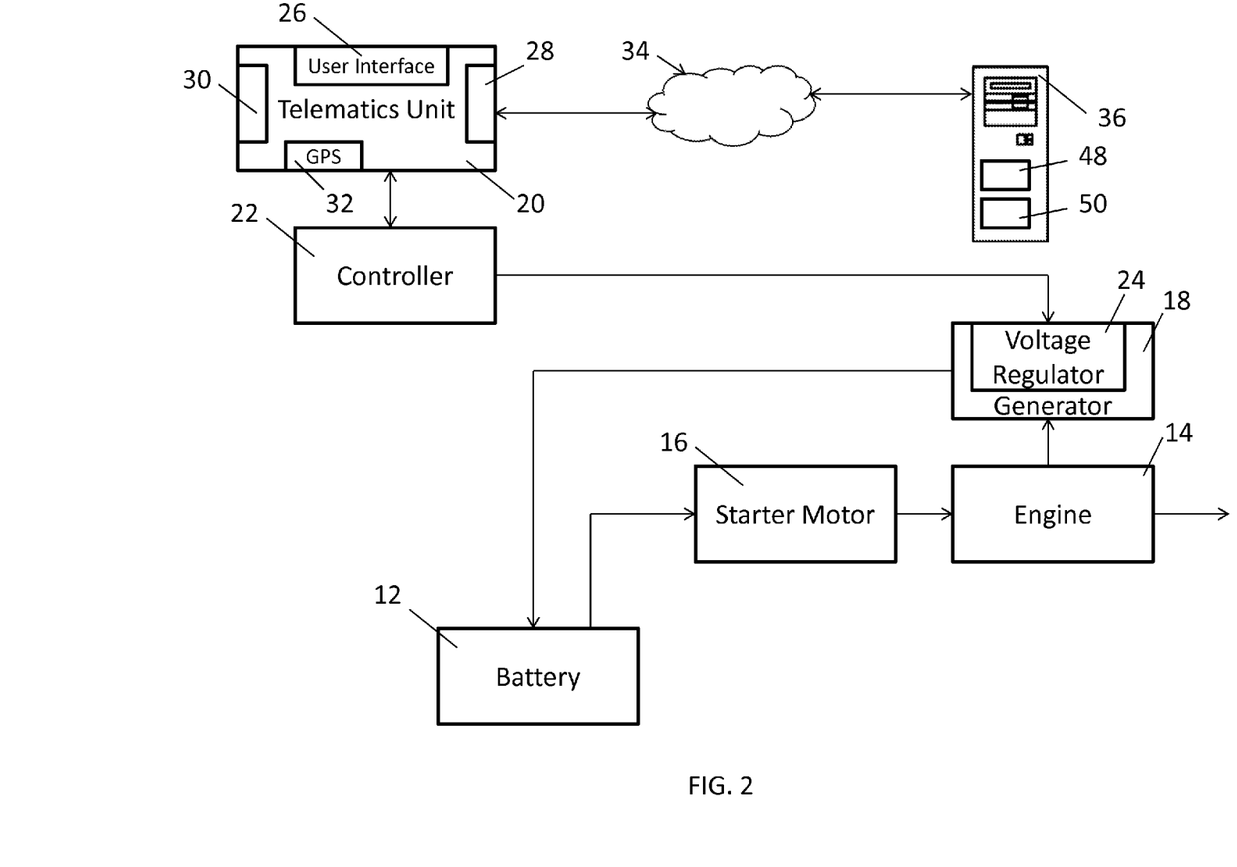
FIG. 2 is a schematic view of one embodiment of a system for controlling a vehicle capable of operating in a fuel economy mode, such as the vehicle of FIG. 1.

Generator 18 is mechanically coupled to engine 14 so that the mechanical output of the engine 14 causes the generator 18 to create electrical power that may be provided to battery 12 and/or other electrical systems in vehicle 10. It is worth noting that generator 18 may be provided according to any number of different embodiments (e.g., generator 18 could be combined with an electric motor into a single unit), may be connected in any number of different configurations, and may include any number of different components, like sensors, control units and/or any other suitable components known in the art. Generator 18 is not limited to any specific generator type or embodiment. Referring to FIG. 2, generator 18 includes a voltage regulator 24 that controls the output voltage of generator 18. A controller, such as controller 22, provides control signals to voltage regulator 24 in response to various vehicle parameter values such as the temperature and state of charge of battery 12 and the required electrical power for vehicle systems that are measured using conventional sensors with the goal of supporting vehicle electrical loads while maintaining a sufficient SOC for battery 12. Controller 22 is configured to cause generator 18, and vehicle 10, to assume different operating modes depending on the measured parameter values. Each operating mode has a predetermined output voltage set point for generator 18 and is initiated in response to predetermined conditions. One operating mode is a "fuel economy mode," which broadly includes any vehicle operating mode in which fuel is conserved by limiting operation of an internal combustion engine, which in turn may be used to drive a generator. In fuel economy mode, the output voltage of generator 18 is set at a relatively low level or the generator 18 is turned off to reduce the demands on engine 14 and, therefore, the fuel consumed by vehicle 10. When vehicle 10 is in fuel economy mode, a larger portion, or all, of the vehicle electrical loads (whether for propulsion or for accessory electrical systems) is provided by battery 12. Both the initiation and termination of fuel economy mode are dependent on various operating conditions of the vehicle. For example, in order to initiate fuel economy mode, conditions may include that the state of charge of battery 12 is greater than a predetermined level (e.g., greater than 80%), that battery current levels are within an acceptable range, that the ambient air temperature is greater than a predetermined temperature and that the field duty cycle of generator 18 is less than predetermined level among other conditions. It should be understood that the conditions for initiating and/or terminating fuel economy mode or other operating modes of generator 18 and vehicle 10 may vary depending on a variety of factors including the design and capabilities of vehicle 10 and components of vehicle 10. In additional to fuel economy mode, other operating modes may include, for example, a charge mode in which the voltage output of generator 18 is set relatively high to recharge battery 12 or otherwise meet relatively high electric loads for vehicle 10, a start up mode in which the voltage output of generator 18 is set relatively high for a short period upon starting the vehicle, a battery sulfation mode in which the voltage output of generator 18 is set relatively high to address a reduced capacity of battery 12, and a voltage reduction mode in which the voltage output of generator 18 is set relatively low when electrical loads on vehicle 10 are relatively low.

Telematics unit 20 can be an OEM-installed (embedded) or aftermarket device that is installed in the vehicle 10 and that enables wireless voice and/or data communication over a wireless carrier system and via wireless networking. Unit 20 may enable communication between vehicle 10 and a call center, other telematics-enabled vehicles, or some other entity or device. Unit 20 can therefore be used to provide a diverse range of vehicle services that involve wireless communication to and/or from the vehicle 10 including, for example, turn-by-turn directions and other navigation-related services, airbag deployment or collision notification and other emergency or roadside assistance-related services, diagnostic reporting and infotainment-related services. Referring to FIG. 2, unit 20 may include a user interface 26, a pair of network interfaces 28, 30, and a GPS receiver 32. Unit 20 may also include a dedicated controller (not shown) including a variety of electronic processing devices and memory devices to control and manage communications between network interfaces 28, 30. Alternatively, unit 20 may rely on a controller shared with other vehicle systems such as controller 22.

User interface 26 enables vehicle occupants to access or initiate various services through telematics unit 20 and to provide and receive information from a call center, other telematics-enabled vehicles or other entity or device. Interface 26 may include any combination of hardware, software and/or other components that enable a vehicle occupant to exchange information or data through unit 20. The interface 26 may therefore include an input components such as a microphone, one or more pushbuttons, a touch-screen display or other input device where user interface 26 receives information from a vehicle occupant, as well as output components like an audio system, a visual display, or an instrument panel, where user interface 26 provides information to the vehicle occupant. Some or all components of user interface 26 may be mounted in various locations including in the vehicle including an instrument panel, center stack console, or on the vehicle's rear view mirror.

Network interface 28 is configured for connection to a telecommunications network 34. Network 34 may comprise the public internet, a local area network (LAN), wide area network (WAN), virtual private network (VPN) or other form of telecommunications network. Network 34 may include a wireless carrier system such as a cellular telephone system implementing analog communications technologies such as AMPS or digital communications technologies such as CDMA (e.g., CDMA2000) or GSM/GPRS. As an alternative or in addition, the wireless carrier system may comprise a satellite communication system that provides unidirectional and bi-directional communication with the vehicle 10. Using the wireless carrier network, telematics unit 20 may be connected to wired communications networks and to remote computing devices 36. Computing devices 36 can be used for various purposes and may comprise, for example, service center computers where diagnostic information and other vehicle data can be uploaded from the vehicle via the telematics unit 20, client computers used by the vehicle owner or other subscriber for such purposes as accessing or receiving vehicle data or to setting up or configuring subscriber preferences or controlling vehicle functions, file servers to or from which vehicle data or other information is provided, web servers, or network address servers. In accordance with certain embodiment of the invention, computing devices 36 may be used to perform one or more steps of a method for controlling vehicle 10 described hereinbelow. According to one embodiment, network interface 28 is used for cellular communication according to either GSM, CDMA, or LTE standards and therefore includes a standard cellular chipset for voice communications like hands-free calling. Alternatively, network interface 28 may be configured for satellite communications. Interface 28 may alternatively include a vocoder, voice over IP (VOIP) equipment, and/or any other suitable device for voice communications. Interface 28 may further include a wireless modem (e.g., a modem using EVDO, CDMA, GPRS or EDGE technologies), a wireless networking component (e.g., one using an IEEE 802.11 protocol, WiMAX, BlueTooth, etc.), or any other suitable device for data transmission and a radio transceiver that transmits signals to and receives signals from a dual antenna for wireless communication with network 34.

Network interface 30 communicates with network interface 28 and is configured for wireless connection to one or more local wireless devices in or near vehicle 10 including vehicle systems and mobile communications devices such as cellular phones to permit the vehicle systems and mobile communications devices to access telecommunications network 34 via network interface 28. In this manner, telematics unit 20 functions as a wireless access point within vehicle 10 (i.e. a hotspot) for vehicle systems and mobile communications devices to access network 34. Network interface 30 may comprise a wireless network interface controller having a radio transceiver configured for short range wireless communication using short-range wireless technologies such as Wi-Fi (IEEE 802.11), WiMAX, Wi-Fi direct, Bluetooth, Zigbee, near field communication (NFC), etc.

GPS receiver 32 provides information indicative of the location of vehicle 10. GPS receiver 32 may receive signals from a constellation of GPS satellites and use these signals to determine vehicle position, as is well understood in the art. Although GPS receiver 32 forms part of telematics unit 20 in the illustrated embodiment, it should be understood that GPS receiver 32 may form a separate component that communicates with telematics unit 20 and other vehicle systems over a vehicle communications bus.

Referring again to FIG. 1, controller 22 may be used to control, govern or otherwise manage certain operations or functions of vehicle 10 and, according to one exemplary embodiment, includes a processing device 38 and a memory device 40. Processing device 38 may include any type of suitable electronic processor (e.g., a microprocessor, a microcontroller, an application specific integrated circuit (ASIC), etc.) that executes instructions for software, firmware, programs, algorithms, scripts, etc. This processor is not limited to any one type of component or device. Memory device 40 may include any type of suitable electronic memory means and may store a variety of data and information. This includes, for example: sensed battery conditions; look-up tables and other data structures; software, firmware, programs, algorithms, scripts, and other electronic instructions; component characteristics and background information, etc. Controller 22 may be electronically connected to other vehicle devices and control modules via I/O devices and suitable connections, like a communications bus, so that they can interact as required. These are, of course, only some of the possible arrangements, functions and capabilities of controller 22, as others are certainly possible. Depending on the particular embodiment, controller 22 may be a stand-alone electronic module (e.g., a vehicle integration control module (VICM)), it may be incorporated or included within another electronic module in the vehicle (e.g., a telematics control module, a power train control module, an engine control module, a hybrid control module, etc.), or it may be part of a larger network or system (e.g., a battery management system (BMS), a vehicle energy management system, etc.), to name a few possibilities.

Figure 3:
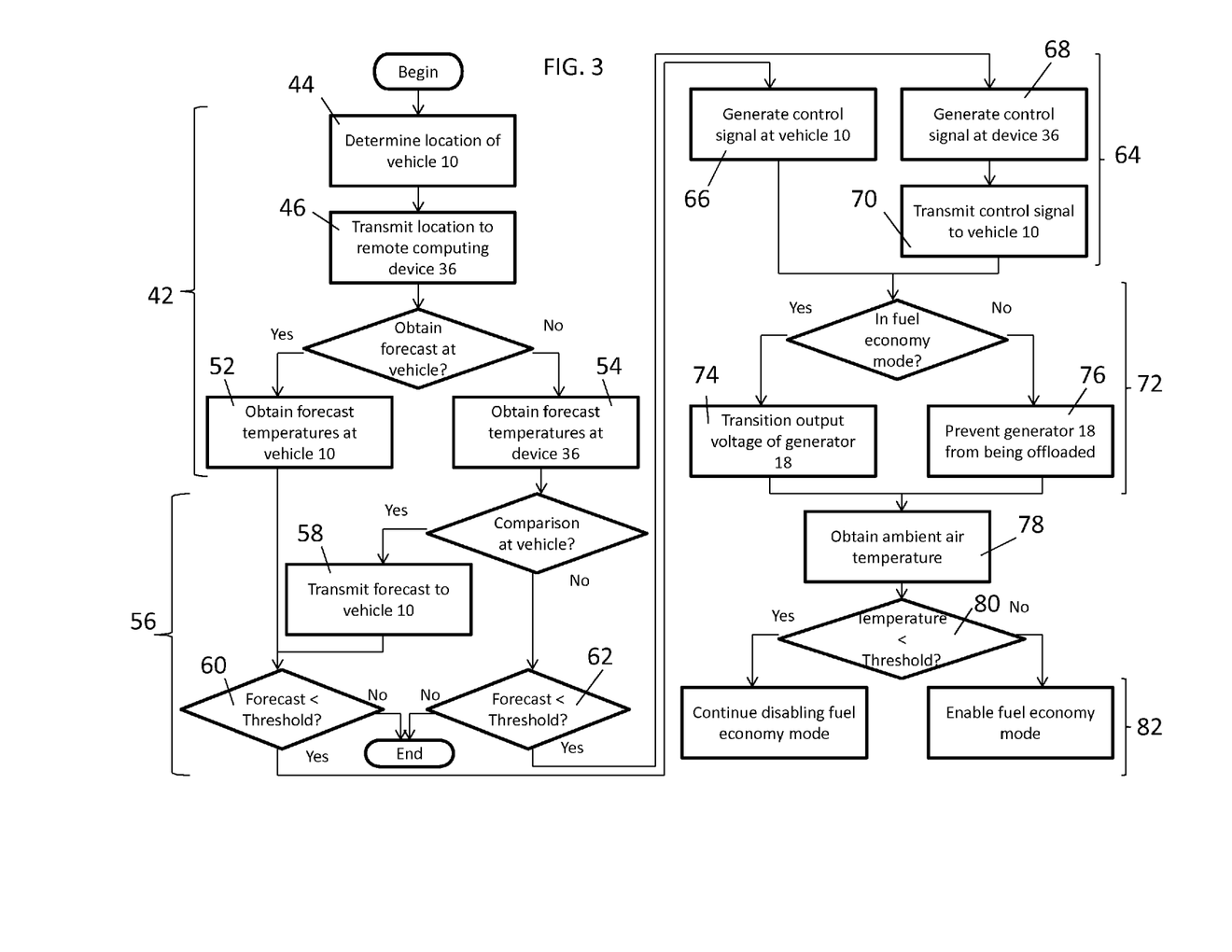
FIG. 3 is a flowchart illustrating embodiments of a method for controlling a vehicle capable of operating in a fuel economy mode.

In accordance with one embodiment, controller 22 is configured with appropriate programming instructions or code (i.e., software) to perform several steps in a method for controlling a vehicle such as vehicle 10 capable of operating in a fuel economy mode in which fuel is conserved by limiting operation of an engine 22. The code may be stored in memory device 40 of controller 22 and may be uploaded to memory device 40 from, a conventional computer storage medium. Referring now to FIG. 3, the method may begin with the step 42 of obtaining a forecast temperature for one or more future dates. Step 42 may include the substep 44 of determining the location of vehicle 10. The current geographic location of vehicle 10 may be determined using the GPS receiver 32 of telematics unit 20 or another GPS receiver within vehicle 10. Alternatively, the current and future locations of vehicle 10 may be determined with reference to a travel plan or itinerary input by a vehicle occupant into a GPS unit, infotainment system, or other system through a conventional user interface similar to interface 26 of telematics unit 20. Step 42 may further include the substep 46 of transmitting the location or locations from vehicle 10 to a remote computing device 36 over wireless telecommunications network 34. The location or locations may be transmitted by telematics unit 20 through network interface 30 over network 34.

As noted hereinabove, certain steps in the method disclosed herein may be performed either within vehicle 10 by controller 22 or external to vehicle 10 by a remote computing device 36 (which, like controller 22, may include one or more processing devices 48 and memory devices 50). Step 42 may therefore include the substep 52 of obtaining the forecast temperature(s) at vehicle 10 or the substep 54 of obtaining the forecast temperature(s) at remote computing device 36 in preparation for additional steps in the method described below. In the case of substep 52, remote computing device 36 may comprise, for example, a dedicated device configured to transmit a configured signal to vehicle 10 over network 34 that is formatted to allow controller 22 to extract forecast temperatures for one or more dates. Alternatively, remote computing device 36 may comprise a web server or a device hosting a web service that generates forecast data for use in various contexts (e.g., www.accuweather.com) and controller 22 may be configured to identify and extract forecast data from the information provided by the web server. In the case of substep 54, device 36 may obtain and store forecast data for a plurality of geographic locations in a database or other memory and retrieve data corresponding to the previously transmitted location or locations of vehicle 10 from that database or other memory. Alternatively, device 36 may be configured to retransmit the locations to yet another computing device and obtain forecast data for the given locations from that device. The forecast temperature(s) obtained by controller 22 or device 36 correspond to the transmitted location or locations of vehicle 10, but on a future date or dates. The forecast temperature for a given day may comprise a single temperature (e.g., a maximum or minimum temperature for a given day) and, in the illustrated embodiment, represents a minimum temperature for a given day. Alternatively, the forecast temperature for a given day may comprise a plurality of temperatures (e.g., maximum or minimum temperatures for a time period within each given day such as each hour of the given day). The number of future dates for which forecast temperature(s) are obtained by controller 22 or device 36 may be set to a default value, selected by a vehicle occupant, and/or may be varied based on one or more vehicle operating characteristics. For example, the number of future dates for which forecast temperatures are obtained may change depending on the distance the vehicle travels over a period of time such that a longer forecast is obtained when the vehicle travels a relatively short distance over the period of time.

Controller 22 may be further configured to perform a geofencing function to account for potential changes in the location of the vehicle that would impact the forecast temperatures that are obtained. In cases where forecast temperatures for multiple days are obtained (whether for a single location or multiple planned locations), it is possible that movement of vehicle 10 to a different or unanticipated location will render one or more forecast temperatures irrelevant. Therefore, controller 22 may be configured to monitor the current location of vehicle 10 using GPS receiver 32, compare that location to the locations associated with one or more forecast temperatures and, if the current location of the vehicle is not the same as the location associated with the forecast temperature or temperatures, return to substep 46 in order to obtain one or more forecast temperatures associated with the current location of vehicle 10. For example, controller 22 may obtain forecast temperatures for three days for a single location based on a location of vehicle 10 obtained at a single point in time using GPS receiver 32. If controller 22 determines on the second day that vehicle 10 is no longer at that location (e.g., that vehicle 10 is more than a predetermined distance from the location), controller 22 may discard the previously obtained forecast temperatures and request one or more new forecast temperatures associated with the current location of the vehicle 10. As another example, controller 22 may obtain forecast temperatures for three days with each temperature associated with a different location as a result of a trip itinerary entered by a vehicle occupant. If controller 22 determines on the second day that vehicle 10 is not at the expected location (e.g., because the vehicle occupant altered travel plans), controller 22 may discard one or more of the previously obtained forecast temperatures and request one or more new forecast temperatures associated with the current location of vehicle 10.

The method may continue with the step 56 of comparing the forecast temperature(s) to a threshold temperature. The comparison may again be performed within vehicle 10 by controller 22 or external to vehicle 10 by remote computing device 36. Where the forecast temperatures are obtained at remote computing device 36, but the comparison takes place at controller 22, step 56 may include the substep 58 of transmitting the forecast temperature(s) from remote computing device 36 to telematics unit 20 of vehicle 10 over the wireless communications network 34. In substeps 60 or 62, controller 22 or remote computing device 36, respectively, compares the forecast temperature(s) to the threshold temperature. In comparing forecast temperatures for multiple days against the threshold temperature, the timing of the comparison of each forecast temperature against the threshold temperature may vary. In one embodiment, the forecast temperature for each day is compared against the threshold at substantially the same time and subsequent actions are based on this comparison. For example, if the comparison indicates that the forecast temperature for any day in a multiple day forecast (e.g., the second day in a three day forecast) meets a predetermined condition relative to the threshold temperature, a predetermined action may be performed. In another embodiment, the forecast temperature for each day in a multi-day forecast may be compared to the threshold temperature at different times. For example, the forecast temperature for the first day in a sequence of days may be compared to the threshold on one day and predetermined actions performed in response, the forecast temperature for the second day in the sequence may be compared to the threshold on the following day and predetermined actions taken in response, and so on. Controller 22 may be further configured to verify, before substeps 60 or 62, that the current location of vehicle 10 matches the location associated with the forecast temperature that will be compared against the threshold temperature. As discussed above, it is possible that movement of vehicle 10 will render one or more previously obtained forecast temperatures irrelevant. Therefore, controller 22 may compare, before substep 60 or 62, the current location of vehicle 10 (obtained, for example, using GPS receiver 32) to the location associated with a forecast temperature that will be compared and, if the location has changed, return to substep 46 to obtain one or more new forecast temperatures.

The method may continue with the step 64 of generating a control signal if the forecast temperature(s) meets a predetermined condition relative to the threshold temperature. As discussed hereinabove, vehicle 10 may be capable of entering a fuel economy mode in which fuel is conserved by limiting the operation of generator 18. In particular, controller 22 may control voltage regulator 24 to set a voltage output of generator 18 at a relatively low level to reduce demands on engine 14. When operating in fuel economy mode, vehicle 10 therefore draws a greater percentage of required electrical power from battery 12 and reduces the SOC of battery 12. Battery 12, however, is required for use in powering the starter motor 16 used to start engine 14. In cold operating environments, the battery SOC must be maintained at a sufficient level to ensure that the battery 12 will be able to provide enough power to activate starter motor 16. In order to address this issue, the control signal is configured to disable the fuel economy mode of vehicle 10. Therefore, the predetermined condition may, for example, be whether the forecast temperature(s) is less than the threshold temperature with the control signal generated if the forecast temperature(s) is less than the threshold temperature and configured to disable fuel economy mode as a result. The control signal may be generated within vehicle 10 by controller 22 or external to vehicle 10 by remote computing device 36. Step 64 may therefore include the substep 66 of generating the control signal at vehicle 10. Alternatively, step 64 may include the substeps 68, 70 of generating the control signal at remote computing device 36 and transmitting the control signal from device 36 to vehicle 10 through telematics unit 20 over network 34. In the latter case, telematics unit 20 may forward the control signal directly to voltage regulator 24 or to controller 22 for further processing with controller 22 generating a subsequent signal to voltage regulator 24.

The method may continue with the step 72 of disabling the fuel economy mode of the vehicle in response to receiving the first control signal. If the vehicle 10 is already operating in fuel economy mode (e.g., where the SOC of battery 12 is above a threshold charge level and other conditions for operating in fuel economy mode exist), step 72 may include the substep 74 of disabling fuel economy mode by transitioning the output voltage of generator 18 from one level associated with fuel economy mode to another level (typically a higher voltage level). If the vehicle is not operating in fuel economy mode, step 7 may include the substep 76 of disabling the fuel economy mode of vehicle 10 and preventing generator 18 from being offloaded in response to receiving the control signal.

Because the described method relies on forecast temperatures for future dates, it is possible that the actual temperatures on those dates may vary from the forecast temperatures and that the actual temperatures may therefore dictate a different action than the forecast temperatures. For example, a forecast temperature may indicate that the temperature for a given date will be less than the threshold temperature such that fuel economy mode should be disabled. The actual temperature on that date, however, may turn out to be higher than the forecast temperature and above the threshold temperature such that fuel economy mode should not be disabled. To account for this possibility the method may further include the step 78 of obtaining an ambient air temperature when the date for which a forecast temperature was obtained arrives. The air temperature may be obtained using a temperature sensor on vehicle 10. The method may continue with the steps 80, 82 of comparing the ambient air temperature to at least one of the threshold temperature and the forecast temperature and generating a control signal if the ambient air temperature meets a predetermined condition relative to the threshold temperature or forecast temperature. For example, controller 22 may compare a measured ambient air temperature to the threshold temperature or forecast temperature and determine that the ambient air temperature is higher than the threshold temperature or the forecast temperature and that, as a result, the fuel economy mode of vehicle 10 should not be disabled. Therefore, in one embodiment, controller 22 determines whether the ambient air temperature for a given date is greater than at least one of the threshold temperature and the forecast temperature for that date and, if so, generates a control signal that is configured to continue to enable the fuel economy mode of vehicle 10. In another embodiment, controller 22 determines whether the ambient air temperature for a given date is less than at least one of the threshold temperature and the forecast temperature for that date and, if so, generates a control signal that is configured to disable the fuel economy mode of vehicle 10. Where the method is based on a multi-day forecast, steps 78, 80, 82 may be performed on each of the actual days covered by the forecast.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for controlling a vehicle capable of operating in a fuel economy mode in which an engine is operating and providing motive power to the vehicle, but fuel is conserved by limiting operation of the engine, comprising the steps of:

obtaining a forecast temperature for a first future date from data generated by a remote computing device;

comparing the forecast temperature to a threshold temperature;

generating a first control signal when the forecast temperature meets a first predetermined condition relative to the threshold temperature, wherein the first control signal is configured to disable the fuel economy mode of the vehicle; and disabling the fuel economy mode of the vehicle in response to receiving the first control signal.

2. The method of claim 1, wherein the obtaining step further comprises:

determining a location of the vehicle;

transmitting the location from the vehicle to the remote computing device over a wireless telecommunications network; and obtaining the forecast temperature at the remote computing device, wherein the forecast temperature corresponds to the location on the first future date.

3. The method of claim 2, wherein the comparing step further comprises comparing the forecast temperature to the threshold temperature at the remote computing device and the generating step further comprises generating the first control signal at the remote computing device and transmitting the first control signal from the remote computing device to the vehicle over the wireless telecommunications network.

4. The method of claim 2, wherein the comparing step further comprises transmitting the forecast temperature from the remote computing device to the vehicle over the wireless communications network and comparing the forecast temperature to the threshold temperature at the vehicle and the generating step further comprises generating the first control signal at the vehicle.

5. The method of claim 1, wherein the obtaining step further comprises:

determining a location of the vehicle; and obtaining the forecast temperature at the vehicle from the data generated by the remote computing device, wherein the forecast temperature corresponds to the location on the first future date.

6. The method of claim 1, wherein the first predetermined condition is whether the forecast temperature is less than the threshold temperature, and the generating step further comprises generating a first control signal when the forecast temperature is less than the threshold temperature.

7. The method of claim 1, further comprising the steps of:

obtaining an ambient air temperature when the first future date arrives;

comparing the ambient air temperature to at least one of the threshold temperature and the forecast temperature; and generating a second control signal when the ambient air temperature meets a second predetermined condition relative to the at least one of the threshold temperature and the forecast temperature.

8. The method of claim 7, wherein the second predetermined condition is whether the ambient air temperature is less than the at least one of the threshold temperature and the forecast temperature, and the generating step further comprises generating a second control signal when the ambient air temperature is less than the at least one of the threshold temperature and the forecast temperature, wherein the second control is configured to continue to disable the fuel economy mode of the vehicle.

9. The method of claim 7, wherein the second predetermined condition is whether the ambient air temperature is greater than the at least one of the threshold temperature and the forecast temperature, and the generating step further comprises generating a second control signal when the ambient air temperature is greater than the at least one of the threshold temperature and the forecast temperature, wherein the second control is configured to continue to enable the fuel economy mode of the vehicle.

10. The method of claim 1, wherein the obtaining step further comprises obtaining a forecast temperature for a second future date, the comparing step further comprises comparing the forecast temperature for the second future date to the threshold temperature and the generating step further comprises generating the first control signal when the forecast temperature for the second future date meets the first predetermined condition relative to the threshold temperature.

11. The method of claim 10, further comprising the steps of:

obtaining a first ambient air temperature when the first future date arrives;

comparing the first ambient air temperature to at least one of the threshold temperature and the forecast temperature for the first future date; and generating a second control signal when the first ambient air temperature meets a second predetermined condition relative to the at least one of the threshold temperature and the forecast temperature for the first future date.

12. The method of claim 11, wherein the second predetermined condition is whether the first ambient air temperature is less than the at least one of the threshold temperature and the forecast temperature for the first future date, and the generating step further comprises generating a second control signal when the first ambient air temperature is less than the at least one of the threshold temperature and the forecast temperature for the first future date, wherein the second control is configured to continue to disable the fuel economy mode of the vehicle.

13. The method of claim 11, further comprising the steps of:

obtaining a second ambient air temperature when the second future date arrives;

comparing the second ambient air temperature to at least one of the threshold temperature and the forecast temperature for the second future date; and generating the second control signal when the second ambient air temperature meets the second predetermined condition relative to the at least one of the threshold temperature and the forecast temperature for the second future date.

14. The method of claim 1, wherein the disabling step is carried out while the vehicle is operating in a mode other than the fuel economy mode, and the disabling step further comprises disabling the fuel economy mode of the vehicle by preventing a generator from being offloaded in response to receiving the first control signal.

15. The method of claim 1, wherein the disabling step is carried out while a battery state-of-charge (SOC) is above a threshold charge level and the vehicle is operating in the fuel economy mode, and the disabling step further comprises disabling the fuel economy mode of the vehicle by transitioning a system voltage associated with a generator from a fuel economy mode level to a nominal level in response to receiving the first control signal.

16. The method of claim 2, further comprising the steps of:
- determining a current location of the vehicle when the first future data arrives;
- comparing the current location of the vehicle to the location of the vehicle corresponding to the forecast temperature for the first future date; and,
- obtaining another forecast temperature corresponding to the current location when the current location of the vehicle meets a predetermined condition relative to the location of the vehicle corresponding to the forecast temperature for the first future date.

17. A system for controlling a vehicle capable of operating in a fuel economy mode in which an engine is operating and providing motive power to the vehicle, but fuel is conserved by limiting operation of the engine, comprising:
- a generator configured to generate electricity responsive to mechanical motion of an engine, the generator having a voltage regulator that regulates an output voltage of the generator;
- a controller configured to:
  - obtain a forecast temperature for a first future date from data generated by a remote computing device;
  - compare the forecast temperature to a threshold temperature;
  - generate a first control signal when the forecast temperature meets a first predetermined condition relative to the threshold temperature, wherein the first control signal is configured to disable the fuel economy mode of the vehicle; and
  - wherein the first control signal causes the voltage regulator to disable the fuel economy mode of the vehicle.

18. The system of claim 17 wherein the controller is further configured to:
- obtain an ambient air temperature when the first future date arrives;
- compare the ambient air temperature to at least one of the threshold temperature or the forecast temperature; and,
- generate a second control signal when the ambient air temperature meets a second predetermined condition relative to the threshold temperature or the forecast temperature.

19. The system of claim 17 wherein the controller is further configured to:
- obtain a forecast temperature for a second future date;
- compare the forecast temperature for the second future date to the threshold temperature; and
- generate the first control signal when the forecast temperature for the second future date meets the first predetermined condition relative to the threshold temperature.

20. The system of claim 19 wherein the controller is further configured to:
- obtain a first ambient air temperature when the first future date arrives;
- compare the first ambient air temperature to at least one of the threshold temperature or the forecast temperature for the first future date; and,
- generate a second control signal when the first ambient air temperature meets a second predetermined condition relative to the threshold temperature or the forecast temperature for the first future date;
- obtain a second ambient air temperature when the second future date arrives;
- compare the second ambient air temperature to at least one of the threshold temperature or the forecast temperature for the second future date; and,
- generate a second control signal when the second ambient air temperature meets the second predetermined condition relative to the threshold temperature or the forecast temperature for the second future date.

* * * * *